Figure 1:
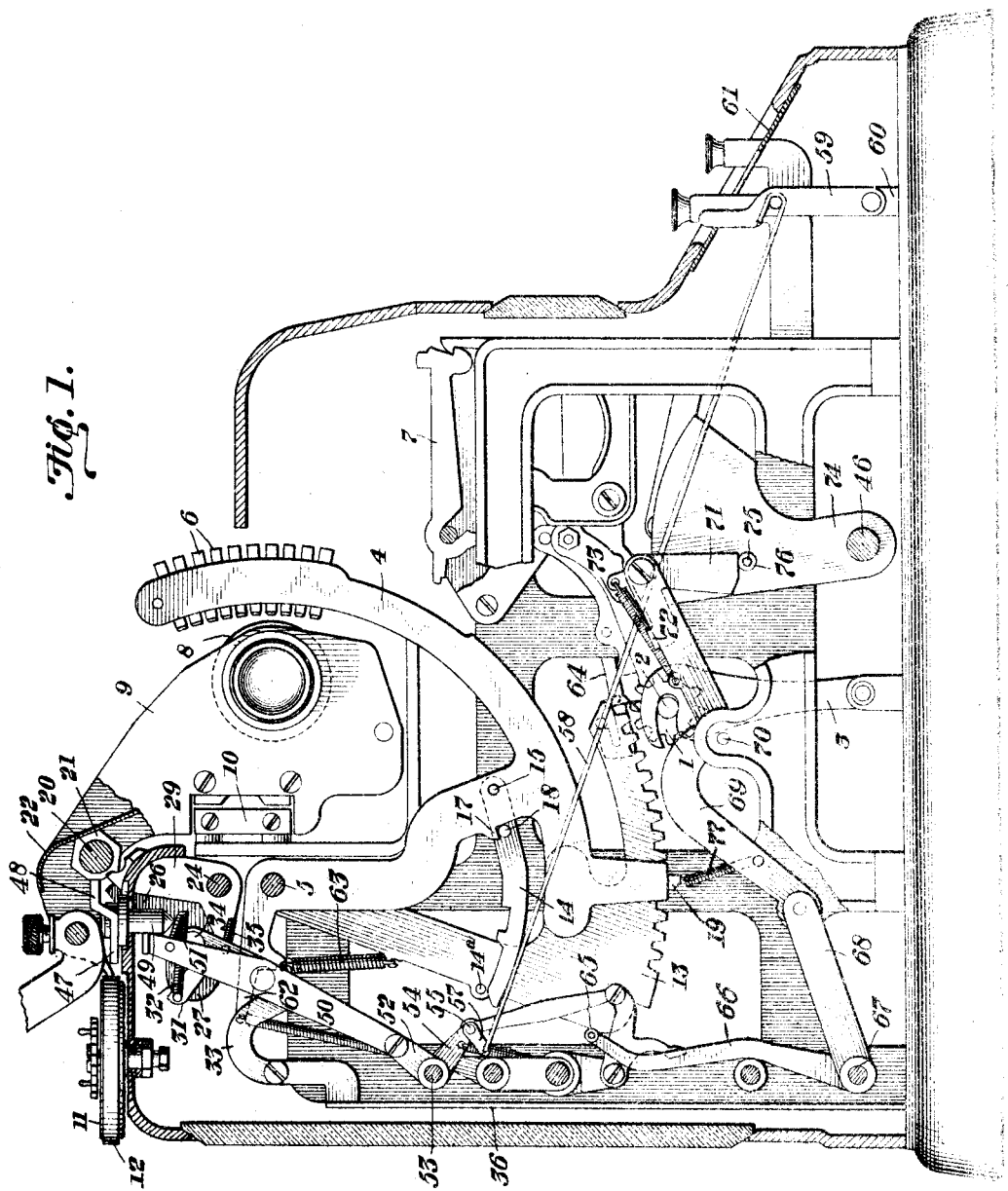

H. LANDSIEDEL.
ADDING AND RECORDING MACHINE.
APPLICATION FILED JAN. 17, 1914.

1,121,734.

Patented Dec. 22, 1914.
6 SHEETS—SHEET 2.

WITNESSES
J. H. Bishop
R. M. Lawrence

INVENTOR
Harry Landsiedel.
BY
Rippey Kingsland
ATTORNEYS

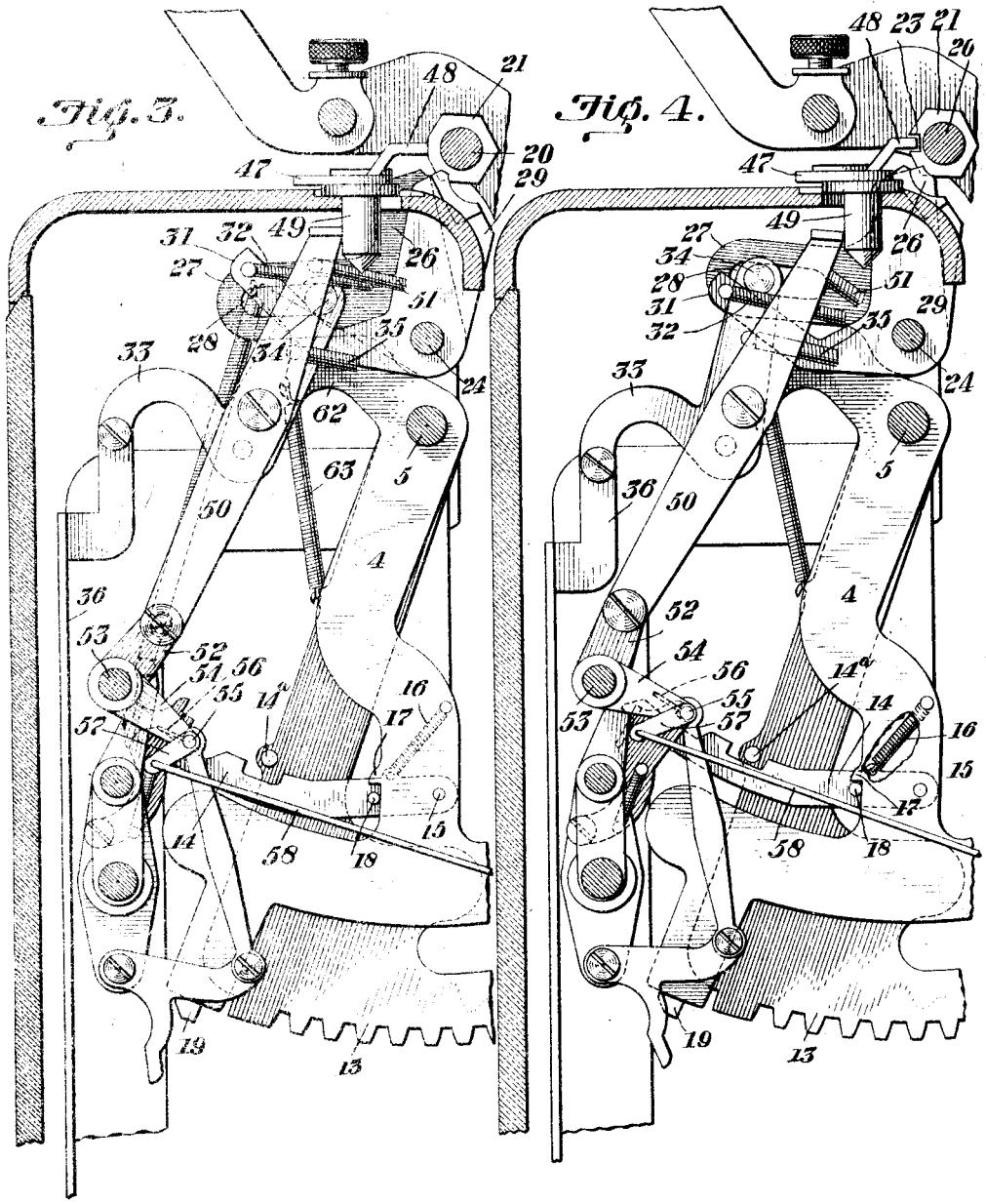

H. LANDSIEDEL.
ADDING AND RECORDING MACHINE.
APPLICATION FILED JAN. 17, 1914.

1,121,734.

Patented Dec. 22, 1914.
6 SHEETS—SHEET 4.

WITNESSES
J. H. Bishop.
R. M. Lawrence.

INVENTOR
Harry Landsiedel.
BY Rippey Kingsland
ATTORNEYS

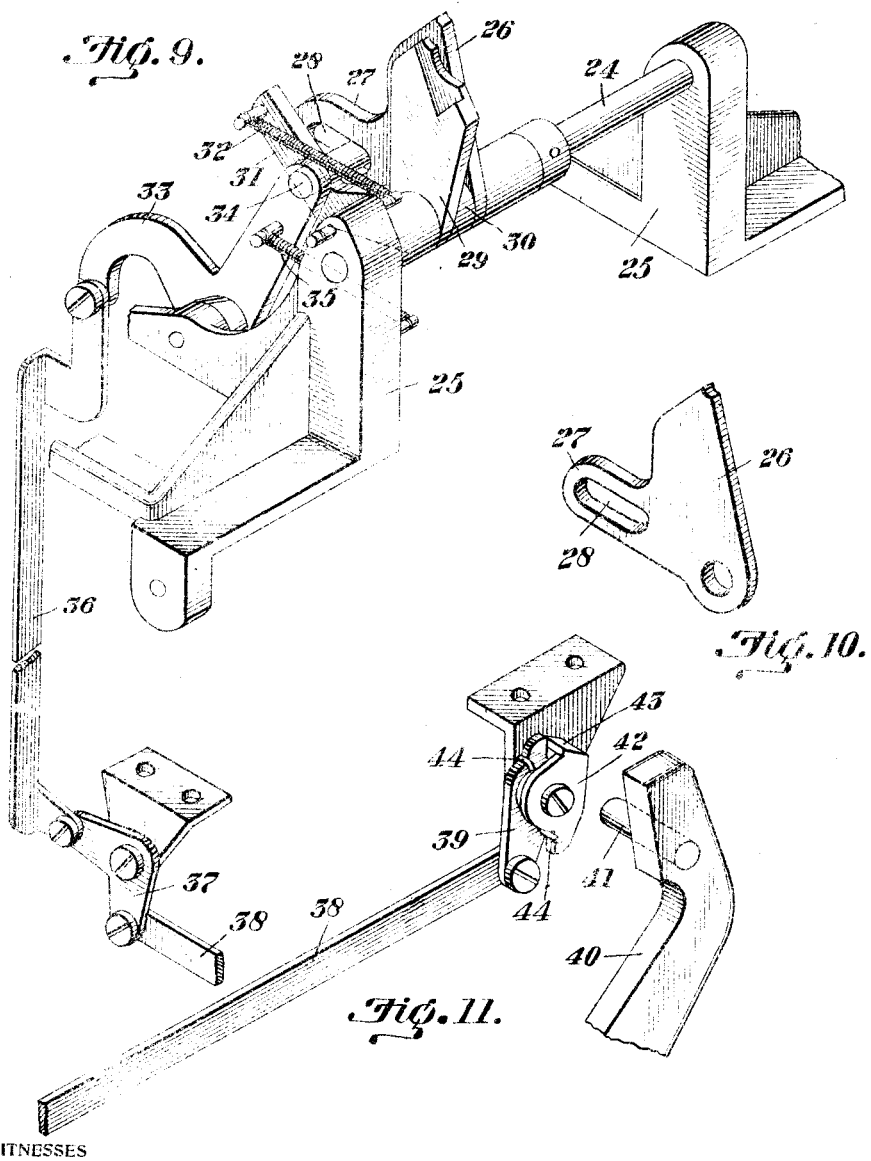

UNITED STATES PATENT OFFICE.

HARRY LANDSIEDEL, OF POPLAR BLUFF, MISSOURI, ASSIGNOR, BY MESNE ASSIGNMENTS, TO THE DALTON ADDING MACHINE COMPANY, OF CINCINNATI, OHIO, A CORPORATION OF OHIO.

ADDING AND RECORDING MACHINE.

1,121,734.  Specification of Letters Patent.  Patented Dec. 22, 1914.

Application filed January 17, 1914. Serial No. 812,655.

*To all whom it may concern:*

Be it known that I, HARRY LANDSIEDEL, a citizen of the United States, residing at the city of Poplar Bluff, county of Butler, and State of Missouri, have invented a new and useful Adding and Recording Machine, of which the following is a specification.

This invention relates to adding and recording machines of the type in which numbers are recorded by operation of the recording mechanism, and are introduced into the adding or accumulating mechanism by devices under control of the recording mechanism.

An object of the invention is to provide an adding and recording machine having a series of type-carriers arranged in numerical orders and operable to record selected numbers, and also including a series of adding wheels arranged in numerical orders, and actuators arranged to coöperate with the type-carriers to operate corresponding adding wheels to add the various numbers recorded, in combination with means for disabling or interrupting the coöperative relationship between various numbers of the type-carriers and actuators so that varying numbers of the type-carriers may be operated to record different numbers without operating the adding mechanism actuators.

Another object of the invention is to provide an adding and recording machine, comprising recording mechanism, and adding mechanism arranged to coöperate with the recording mechanism to add the numbers recorded, in combination with laterally movable paper carriage arranged to feed paper to the recording mechanism, and a novel form of devices under control of the paper carriage for disabling or interrupting the coöperative relationship between the recording mechanism and the actuators for the adding mechanism, so that numbers may be recorded without operating the adding mechanism.

A further object is to produce a machine of the character described comprising actuators for multiple order adding mechanism arranged in coöperative relationship with multiple order recording mechanism, a laterally movable paper carriage controlling suitable mechanism for disabling or interrupting the coöperative relationship between all of the actuators and the recording mechanism in predetermined positions of the paper carriage, and independently operable means for disabling or interrupting such coöperative relationship between less than all orders of the actuators and the recording mechanism.

A still further object is to provide a machine of the character described comprising multiple order adding and recording mechanisms arranged to coöperate so that the numbers recorded will also be added, in combination with means for disabling or interrupting the coöperative relationship between said adding and recording mechanisms in a varying plurality of orders at the will of the operator.

Various other advantages and objects will appear from the following detailed description, reference being made to the accompanying drawings in which—

Figure 2:
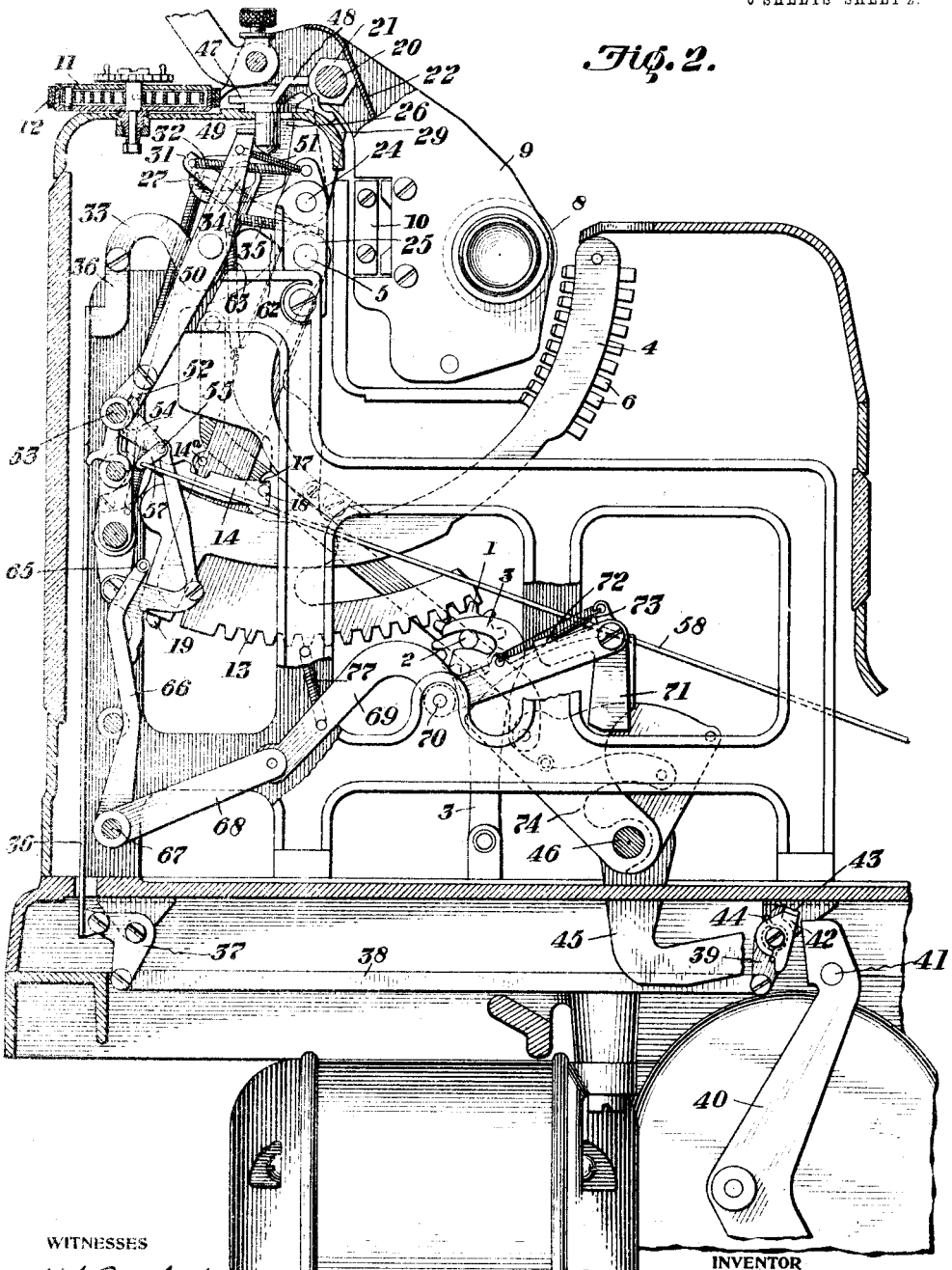
Figure 5:
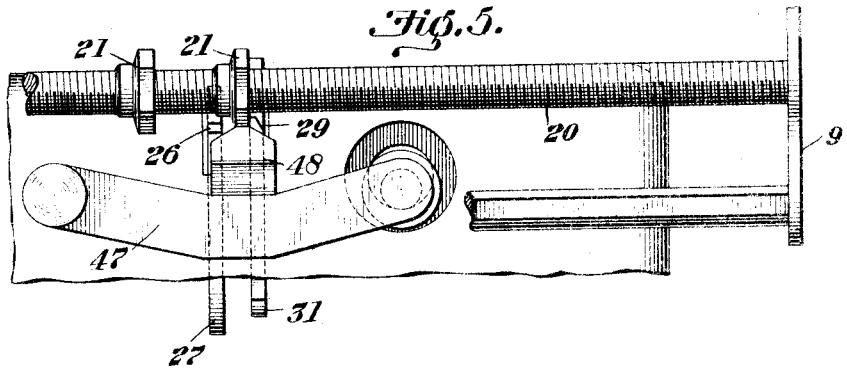
Figure 6:
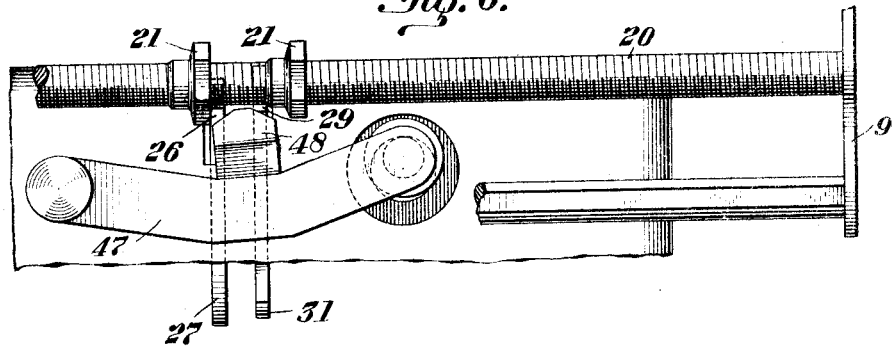
Figure 7:
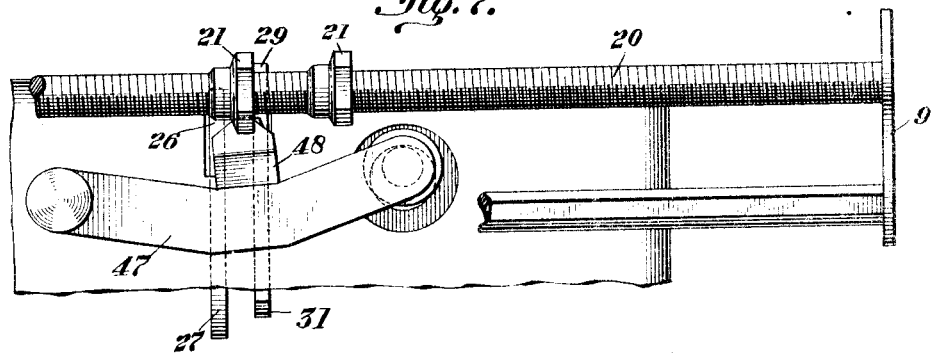
Figure 8:
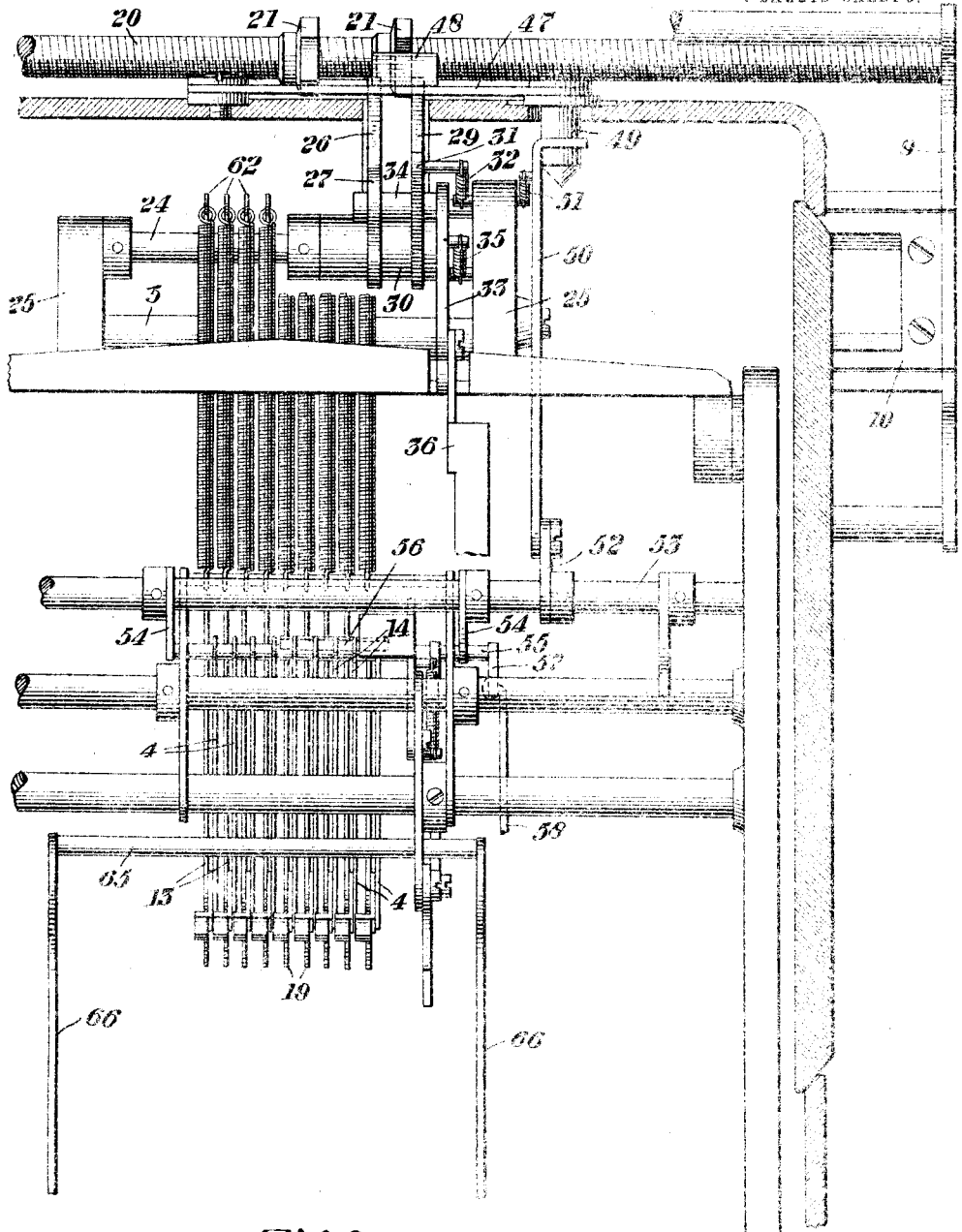

Figure 1 is a longitudinal sectional view of a machine embodying one form of my invention, and illustrating the recording mechanism operating independently of the actuators for the adding mechanism. Fig. 2 is a similar sectional view illustrating the recording and adding mechanisms in their normal positions, the machine being adjusted, however, so that the recording mechanism may operate independently of the actuators for the adding mechanism, such adjustment being effected by the position of the paper carriage. Fig. 3 is an enlarged sectional view illustrating the train of connections under control of the paper carriage whereby the coöperative relationship between the recording mechanism and the actuators for the adding mechanism is disabled or interrupted. Fig. 4 is a corresponding sectional view illustrating connections whereby coöperative relationship between the adding and recording mechanism is effected, this, however, differing from Fig. 3 in illustrating the actuators for the adding mechanism arranged to coöperate with the recording mechanism, whereas Fig. 3 illustrates the parts adjusted so that the recording mechanism may operate independently of the actuators for the adding mechanism. Fig. 5 is a plan view of a part of the machine illustrating the devices by which the paper carriage actuates the train of connections for uncoupling the recording mechanism from the actuators for the adding mechanism to permit independent operation of the recording mechanism in certain adjustments of the paper carriage. Fig. 6 is a view illustrating the position of the same parts illustrated in Fig. 5 during the return movement of the recording mechanism after a number has been recorded but not added. Fig. 7 is a view illustrating the position of the parts when the paper carriage is adjusted to permit the adding and recording mechanisms to coöperate in the adding and recording operations. Fig. 8 is a rear elevation of mechanism illustrated in Figs. 3 and 4. Fig. 9 is a perspective view of the paper carriage escapement mechanism, and the train of connections whereby the escapement mechanism is automatically operated to permit lateral movement of the paper carriage in cross-footing. Fig. 10 is a perspective view of one of the escapement pawls or stops removed from its support. Fig. 11 is a perspective view of a part of the connections under control of the motor whereby the paper carriage is released and enabled to move laterally a column space for cross-footing work at each operation of the motor.

The machine with which I have illustrated my invention has its prototype in the adding and listing mechanism constituting a part of the subject matter of Hopkins Patent No. 1,039,130, dated September 24, 1912. Many of the features of the machine with which I have illustrated my present invention also exist in the Dalton adding machine, which is manufactured under the said Hopkins patent. For the purpose of illustrating my present invention I have also illustrated so much of the structure of the adding and listing mechanism of the Hopkins patent, and of the Dalton adding machine as directly relate to and coöperate with this invention. For instance, the machine with which my invention is to be combined includes a series of adding wheels 1 arranged in numerical orders, and supported upon a rod or shaft 2 mounted in a frame 3. The shaft 2 is raised and lowered as usual during the operation of the recording mechanism hereinafter described, so that the numbers recorded will be added, unless the coöperative relationship between the recording mechanism and the actuators for the adding mechanism is disabled or interrupted by the mechanism included in the present invention in order to enable numbers to be listed without adding.

Any of the usual forms of differential mechanism may be employed to limit the movement of the recording mechanism. I have not illustrated the differential mechanism in the accompanying drawings for the reason that it does not alter or modify the operation of any of the parts included in this invention.

It will be apparent from the subsequent description that my invention is not limited to use in connection with any specific form of differential mechanism but is capable of use in machines of different types.

In the embodiment of my invention illustrated a series of type-carriers 4 are suspended upon a shaft 5 and support the usual type 6 upon their front or upper ends, and arranged to be struck by the hammers 7, in the usual manner, to print upon paper against the platen 8. The platen 8 is mounted in a laterally movable paper carriage 9 arranged to operate upon a supporting rail 10, and actuated in one direction by a spring drum 11 having a band or tape 12 connected to the carriage. For each of the type-carriers there is a coöperating rack 13, said racks also being suspended from the shaft 5, arranged to coöperate with the adding wheels 1 in the usual manner to actuate said adding wheels in adding and clearing operations.

Each type-carrier may be coupled with or released from its coöperating rack, so that the type-carriers may operate without operating the corresponding racks, thereby enabling the operator to use the machine as a listing machine without adding the numbers listed. The coupling device whereby the type-carriers and racks are optionally coupled together or released from each other, is similar to the coupling device disclosed in Dalton and Magnus Patent No. 1,049,057, dated December 31, 1912. The coupling device whereby each type-carrier may be optionally coupled with or disconnected from the corresponding rack comprises a coupling arm 14 pivoted to each type-carrier at 15 and actuated upwardly by a spring 16 having its lower end connected to a coupling arm and its upper end connected to the type-carrier. Each coupling arm is provided with a notch in its upper side adapted to receive a pin 14ª on the corresponding rack and thereby couple the type-carrier and rack for joint operation in adding and recording operations. For limiting upward movement of the coupling arms 14 each type-carrier is provided with a shoulder 17 and each coupling arm is provided with a pin 18 adapted to engage the corresponding shoulder 17 as illustrated in Figs. 1 and 4. These coupling arms are substantially the same as the coupling devices constituting a part of the subject matter of the Dalton and Magnus Patent No. 1,049,057 previously mentioned. As in the case of the Dalton and Magnus patent each type-carrier is provided with a depending projection 19 arranged to coöperate directly with the differential mechanism to limit movement of the type-carriers when the type-carriers are alone operated to record, and limit movement of both the type-carriers and racks when the machine is operated in combined adding and recording operations. The mechanism for controlling the type-carriers and racks, that is for permitting them to move to record, and to return them after each operation, is of the usual and well known type disclosed in the said Hopkins patent and in the Dalton and Magnus patent, and found in the Dalton adding machine of commerce.

For the purpose of comprehending the present invention it may be assumed that all the foregoing mechanism exists in the prior art, and that my invention is an addition thereto and an improvement thereon.

In view of the foregoing explanation of the machine with which my invention is combined and upon which it is an improvement, I will now proceed to a detailed description of the present invention.

As distinguished from the machine of the Dalton and Magnus patent in which the couplings 14 are connected to only a limited number of the type-carriers and racks, I have, in the present case equipped the type-carrier and rack in each denominational order in the machine with one of the releasable couplings. In addition, as I will presently describe, I have provided means for disabling or interrupting the coöperative relationship between varied numbers of the racks and type-carriers, so that all of the racks may be disconnected from the type-carriers, to enable the machine to be used as a straight listing machine without the functions of addition; or, a less number of the racks may be disconnected from the type-carriers at the will of the operator, so that the machine may be operated to list and add numbers in one column, and at the same time list numbers in an adjacent column without adding the last mentioned numbers. In the particular embodiment illustrated the paper carriage is movable laterally to receive records in various column spaces, with provision for uncoupling the type-carriers from all of the racks when adjusted in certain column spaces, and for permitting automatic coupling up of the type-carriers and racks when said carriage is adjusted to receive records in other column spaces. Thus, certain columns of numbers may be listed without adding, and other adjacent columns may be listed and added, and whether or not the adding functions of the entire machine are eliminated will be determined by the position of the paper carriage. The mechanism for uncoupling a less number than all of the type-carriers from the corresponding racks is manipulative independently of the paper carriage, so that the adding functions of the machine will be eliminated only in certain denominational orders while the adding functions in the remaining denominational orders are not interrupted.

With the foregoing general mention of some of the uses of the machine I will now proceed to a description of the specific form of the invention which I have illustrated.

The paper carriage includes a threaded rod or shaft 20. The rod 20 supports a series of independently adjustable stops 21 which are capable of lateral movement upon the rod to any desired precise adjustment. The stops 21 are the tabulating or column space stops whereby the carriage is held in any selected adjustment against the power of the motor 11. Each stop comprises a sleeve portion and a flange portion, the flange portion being preferably polygonal and adapted to be engaged by a plate 22 mounted in the paper carriage. The plate 22 resting against adjacent flat edges of the stops lock or hold the stops and prevent them from turning on the rod 20, so that said stops will be positively held in whatever adjustment they may be placed. A flat portion on certain ones or all of the stops may be provided with a notch 23 which, in certain adjustments of the stops, receives an abutment on one member of the train of connections by which the adding functions of the machine are eliminated. A rod or shaft 24 is supported in frame parts 25 above the shaft 5, and supports an escapement member 26 having a rearwardly extending arm 27 provided with a slot 28. Another escapement member 29 is pivotally supported upon the rod or shaft 24 and is separated from the escapement member 26 by an intervening sleeve 30. The sleeve 30 is of greater length than the thickness of the flange portions on the stops 21, so that when one of the stops 21 engages the escapement member 29 the member 26 will be on the opposite side of the stop 21. The escapement member 26 is provided with a rearwardly projecting portion 31. A spring 32 actuates the member 29 toward the stops 21, so that in the normal working of the machine one of the stops 21 will be engaged with the escapement member 29. The escapement member 29 thus holds the paper carriage in its various column space positions. The carriage is actuated laterally and is moved from column to column by the motor 11. To enable the motor 11 to move the carriage from one column to another the escapement members 26 and 29 are operated by the devices and in the manner next described.

A bell crank lever 33 is pivoted upon one of the supports 25 and is provided with a pin 34 extending across the upper edge of the arm 31 which is a part of the escapement member 29, said pin also extending into the slot 28 in the rear arm of the escapement member 26. The upper arm of the lever 33 is actuated forwardly by a spring 35, thereby holding the pin 34 near the front end of the slot 28 and in such position that the member 29 may be engaged by one of the stops 21. Rearward movement of the upper arm of the lever 23 causes the pin 34 to depress the arm 31 in opposition to the spring 32, and thereby disengage the member 29 from the stop 21, said pin 34 also moving the escapement member 26 forwardly in position to be engaged by one of the stops 21. When the number 29 is thus released from the stop 21 the motor 11 actuates the carriage leftwardly with respect to the operator until the next stop 21 engages the member 26. When the lever 33 is returned to its normal position the member 29 is moved forwardly by its spring 32, and the member 26 is disengaged from the stop 21. Thereupon the motor 11 actuates the carriage an additional distance until the stop 21 which had been engaged by the member 26 moves into engagement with the member 29. A link 36 has its upper end pivoted to the rear arm of the bell crank lever 33, and its lower end pivoted to the rear arm of a bell crank lever 37 which may be, as in the present instance it is illustrated, pivotally supported under the base of the machine proper. A link 38 is pivoted at its rear end to the lower arm of the bell crank lever 37, and has its front end pivoted to a lever 39. The usual motor-actuated operating lever 40 is provided with a pin 41, arranged to coöperate with the lever 39 through an escapement device, so that the lever 40 may move in one direction without operating the train of connections leading to the member 26 and 29 controlling the carriage in its column space movements, said pin also coöperating with the escapement device so that movement of the lever 40 in the opposite direction will actuate the train of connections and enable the carriage to be moved in its column space movements. An escapement member 42 is pivotally supported at the side of the lever 39 and has a projection 43 engaging against the front edge of an upward extension of the lever 39. A spring 44 is arranged in an obvious manner to hold the projection 43 in engagement with the extension of the lever 39, as illustrated in Fig. 11. The lever 40 is the usual motor-actuated lever and coöperates with a lever 45 mounted on the usual rock shaft 46, and controlling operation of the machine for adding and recording purposes in the usual way. For present purposes it is sufficient to state that the upper end of the lever 40 moves rearwardly (to the left as illustrated in Fig. 2) to coöperate with the lever 45 and enable the type-carriers to move forward to record, and to enable the racks and type-carriers to operate when the machine is used as an adding and listing machine. When the lever 40 is moving rearwardly the pin 41 rubs against the lower end of the escapement member 41, the spring 44 yielding, until said pin 41 has passed or escapes behind the lower end of said member 43. When the lever 40 swings back to the normal position illustrated in Fig. 2 the pin 41 engages against the rear edge of the lower arm of the escapement member 42 and thereby actuates the train of connections controlling the members 26 and 29 and enabling the paper carriage to operate to another column space. When the pin 41 becomes released from the member 42 the spring 35 restores to their normal position the connections controlling the members 26 and 29.

A lever 47 is pivotally supported upon a stationary part of the machine adjacent to the rod 20, and is arranged to coöperate with the stops 21 to eliminate the adding functions of the machine so as to enable the machine to be operated as a listing machine without adding the numbers listed. The lever 47 is provided with an arm 48 arranged to be engaged by the flat surfaces of the stops 21 when the flat surfaces of said stops are toward the end of the arm 48. Said arm 48 is also arranged to be received in the notches 23 when said notches are toward said arm. Thus, in certain adjustments of the stops 21 the lever 47 will be actuated and held in its rearward position during the listing of numbers, and in certain other adjustments of the stops 21 the lever 47 will not be interfered with. The lever 47 is provided with a projection 49, which extends in front of the upper end of the lever 50, so that when the lever 47 is moved rearwardly the upper end of the lever 50 will also be moved rearwardly in opposition to a spring 51 which actuates the upper end of the said lever 50 forwardly. The lower end of the lever 50 is pivoted to an arm 52 which is attached to a rock shaft 53. Two forwardly extending arms 54 are rigidly connected to the rock shaft 53 and support a rod 55 extending transversely over the rear ends of the couplings 14. From the foregoing it will be understood that when the lever 47 is moved by any of the stops 21 the rod 55 will be depressed a sufficient distance to disengage the couplings 14 from the coupling pins 14ª on the racks. In the embodiment illustrated all of the couplings will be disconnected, so that the machine may be operated as a listing machine without adding the numbers listed. Also it will be understood that the adding functions may be eliminated in any desired columns by simply manipulating the stops 21 so that the flat surfaces thereon will be presented to and operate the arm 48 resulting in uncoupling the type-carriers from their associated racks in all denominational orders of the machine.

My invention also includes mechanism for disabling or interrupting the coöperative relationship between the type-carriers and the actuators for the adding mechanism in less than all denominational orders of the machine, so that the machine is operative to eliminate the adding functions in a varied plurality of denominational orders. In the embodiment illustrated the invention includes, in addition to the mechanism hereinbefore described, means for uncoupling the type-carriers from the associated racks in the five higher denominational orders, though it will be apparent that the structure may be varied within the scope of the present invention so that any desired number of type-carriers may be uncoupled from their associated racks. The specific form of the device for uncoupling the type-carriers and racks in higher orders includes a blade 56 (Figs. 4 and 8), attached to the rear side of the rod 55 above the rearwardly extending ends of the couplings 14. The rod 55 is revolubly or rockably supported by the arms 54 and has an arm 57 on one end. A link 58 has its rear end connected to the arm 57 and its front end pivoted to a lever 59. The lever 59 is pivoted upon a support 60 and extends upwardly through a slot in the key-board plate 61 in a position adjacent to the key-board and convenient for manipulation. By moving the upper end of the lever 59 forwardly the rod 55 will be rocked and the blade 56 depressed thereby effectively to engage with and uncouple or disengage the coupling 14 from the pins 14ᵃ, thus releasing the type-carriers from their associated racks in the five higher denominational orders. When the machine is adjusted in this manner the type-carriers in the higher denominational orders may be operated to record numbers without said numbers being added at the same time that the type-carriers in the lower denominational orders are operated to record and add numbers. It may be desirable in such operations of the machine to enable the racks in the higher orders to operate in carrying or transferring any of the adding mechanism when carrying or transferring is required to maintain in the adding mechanism the total of all numbers recorded in lower orders. Such operation is frequently referred to as an extended total operation, and provision is made for thus extending the total from the lower denominational orders into the higher denominational orders in which the type-carriers are uncoupled from their associated racks. Thus, each type-carrier is provided with a rearwardly extending arm 62 which is connected to the corresponding rack by a spring 63. The spring 63 is the usual spring in the specific machine illustrated for actuating the racks rearwardly for carrying and transferring operations, and the racks are released from their stop devices 64 in the usual manner. Thus, as usual in these machines, when it is necessary to carry or transfer from a lower to a higher order the rack 13, whose operation is necessary for the transferring or carrying, is permitted to move rearwardly a slight distance sufficient to actuate its corresponding adding wheel the distance required to set said wheel to represent the digit carried over. This ordinary operation is retained in the present machine.

For restoring the racks after each carrying or transferring operation thereof special equipment is required because of the fact that the type-carriers are disconnected from said racks in certain of the orders. The mechanism for returning the racks to their idle position after each carrying or transferring operation includes a rod 65 supported transversely behind the racks 13 by arms 66 which are attached to a rock shaft 67. The rock shaft 67 has an arm 68 rigidly attached thereto and having its front end pivoted to the rear end of a lever 69. The lever 69 is pivotally supported at 70 and carries a bell-crank lever 71 on its forward end. The bell crank lever 71 has a depending arm, and a rearwardly extending arm. The rearwardly extending arm of the lever 71 has a lateral projection 72 extending across the upper edge of the lever 69. An upward extension of the lever 71 is connected to the lever 69 by a spring 73 which is effective to hold the lever 71 in the position illustrated in Figs. 1 and 2. The usual rock shaft 46 supports an arm 74 having a pin 75 supporting a roller 76. When the shaft 46 is rocked forwardly in the usual operation of the machine to permit the type-carriers to move forwardly to record, the roller 76 contacts with the lower end of the lever 71 as illustrated in Fig. 1, thereby actuating the rod 65 forwardly through the train of connections controlling said rod. The forward movement of the rod 65 actuates the racks 13 and again engages them in their usual engagement with the members 64. The forward rocking of the shaft 46 eventually carries the roller 76 beyond the lower end of the lever 71, whereupon the train of connections from said lever 71 to the rod 65 are restored to their idle position by a spring 77 connecting the lever 69 with a stationary part of the machine. Backward or return movement of the roller 76 simply turns the lever 71 on its pivot until said roller has passed beyond the lower end of said lever.

It will be understood that many of the features of the present invention are capable of embodiment in various types of machines without materially modifying or changing the operation of the devices included in the invention.

I do not restrict myself to the use of the invention in any specific type of machine but contemplate such mechanical variations as will enable persons skilled in the art to utilize the invention in whatever embodiment may be preferred.

What I claim and desire to secure by Letters Patent is:

1. An adding and recording machine comprising a series of type-carriers arranged in numerical orders, a series of adding wheels under control of said type-carriers also arranged in numerical orders, means for operating said type-carriers and said adding wheels to record and add numbers, and means for disabling the coöperative relationship between the type-carriers and adding wheels in a varying plurality of orders.

2. An adding and recording machine, comprising a series of type-carriers arranged in numerical orders, a series of adding wheels also arranged in numerical orders, and actuators arranged to coöperate with the type-carriers to operate corresponding adding wheels to add the numbers recorded, in combination with means for disabling the coöperative relationship between various numbers of the type-carriers and actuators so that varying numbers of the type-carriers may be operated independently of the corresponding adding wheels.

3. An adding and recording machine, comprising recording mechanism, adding mechanism arranged to coöperate with the recording mechanism to add the numbers recorded, and means for disabling the coöperative relationship between various parts of the recording mechanism and corresponding parts of the adding mechanism whereby said parts of the recording mechanism may operate independently of the adding mechanism.

4. An adding and recording machine, comprising a series of type-carriers arranged in numerical orders, adding wheels arranged in numerical orders, and automatic means for operating said adding wheels when numbers are recorded, in combination with means for enabling all of said type-carriers to operate independently of the adding mechanism, and means for enabling certain of said type-carriers to operate independently of the adding mechanism at the same time that other type-carriers and corresponding portions of the adding mechanism operate in recording and adding operations.

5. In an adding machine, type-carriers, operable to record a plurality of columns of data at a single operation, a rack for each type-carrier, an adding wheel operatively related to each rack, and means for controlling said racks effectively to prevent addition of the data in only one or in a plurality of said columns recorded as aforesaid, as desired.

6. In an adding machine, type-carriers operable to record numbers, racks, adding wheels enmeshed with said racks, means under control of the type-carriers for operating said racks and thereby the adding wheels, and means for disconnecting varied numbers of said racks from the type-carriers, substantially as described.

7. In an adding machine, a series of type-carriers arranged in numerical orders and operable side by side to record a number of columns of items at a single operation, racks, devices connecting said racks and type-carriers, means for disconnecting said racks from said type-carriers in a varying plurality of orders, and means for holding the disconnected racks from movement with the corresponding type-carriers.

8. In an adding machine, a series of type-carriers operable to record a number of columns of items at a single operation, a shaft, adding wheels mounted on said shaft and held permanently in axial alinement, and mechanism for causing said adding wheels to add the items recorded in all of said columns recorded at a single operation as aforesaid or any one of said columns only, or for preventing said adding wheels from adding any of said numbers, substantially as described.

9. In an adding machine, a series of type-carriers operable to record a number of columns of items at a single operation, a shaft, adding wheels mounted on said shaft and held permanently in axial alinement, mechanism for causing said adding wheels to add the items recorded in one of said columns only, or in all of said columns as desired, means for preventing said adding wheels from adding the numbers in any of said columns, and means for extending the total of one column of items from the adding wheels of that column into the adding wheels for an adjacent column.

10. In an adding machine, a series of type-carriers arranged in numerical orders and operable side by side effectively to record numbers, adding mechanism, means for operating said racks effectively to cause said adding mechanism to add the numbers recorded, and means for preventing a varying plurality of racks from operating when the corresponding type-carriers are operated in recording operation, substantially as described.

11. An adding and recording machine, comprising a series of type-carriers arranged in numerical orders, adding wheels also arranged in numerical orders, means for operating said adding wheels to add the numbers recorded by said type-carriers, and means for preventing operation of the adding wheels in a varying plurality of orders when the corresponding type-carriers operate.

12. An adding and recording machine, comprising type-carriers arranged in numerical orders and operable in recording operations, racks, adding wheels under control of said racks, means connecting said type-carriers with said racks whereby said racks will be operated with said type-carriers, and optionally operable means for disconnecting the racks from the type-carriers in a varying plurality of orders to enable the disconnected type-carriers to operate independently of the racks and adding wheels.

13. In an adding machine, type-carriers arranged in numerical orders and operable to record one or more columns of data at a single operation, a rack for each type-carrier, an adding wheel operatively related to each rack, releasable means connecting said racks with said type-carriers, and means for disconnecting the racks from the type-carriers in a varying plurality of orders to prevent addition of the data in one or more of said columns, as desired.

14. In an adding machine, a laterally movable paper carriage, recording devices arranged in numerical orders and operable to record numbers on paper in said carriage, racks operated by said recording devices, adding wheels controlled by said racks to add the numbers recorded, and mechanism under control of said paper carriage to prevent operation of said racks.

15. In an adding machine, recording devices arranged in numerical orders and operable to record numbers on paper in the paper carriage, a laterally movable paper carriage arranged to feed paper to said recording devices, adding wheels, racks connected to said recording devices for operating said adding wheels, means under control of the paper carriage for disconnecting said racks from said recording devices, and means for disconnecting certain of said racks from the corresponding recording devices independently of said carriage.

16. In an adding machine, a laterally movable paper, a series of type-carriers arranged in numerical orders and operable side by side to record numbers on paper in said carriage, racks, devices connecting said racks and said type-carriers, adding wheels arranged in numerical orders under control of said racks to add numbers recorded, and means under control of said paper carriage for disconnecting said racks from said type-carriers.

17. In an adding machine, a series of type-carriers arranged in numerical orders and operable side by side to record numbers, a laterally movable paper carriage for delivering paper to said type-carriers, racks, devices connecting said racks and said type-carriers, adding wheels under control of said racks to add the numbers recorded, means under control of said paper carriage for disconnecting said racks from said type-carriers, and means for disconnecting certain of said racks from corresponding type-carriers independently of said paper carriage.

18. In an adding machine, a series of type-carriers arranged in numerical orders, racks, releasable coupling devices coupling said racks with said type-carriers, and optionally operable means for disconnecting said coupling devices to release said racks in a varying plurality of orders.

19. In an adding and recording machine, the combination with type-carriers arranged in numerical orders and operable in recording operations, adding wheels also arranged in numerical orders, racks, couplings between said racks and type-carriers whereby said type-carriers will operate said racks and thereby said adding wheels to add the numbers recorded, of means for disengaging said couplings in a varying plurality of orders to enable varying numbers of said type-carriers to operate in recording operations independently of the corresponding racks and adding wheels, and means for holding stationary the racks from which said couplings are disengaged.

20. In an adding and recording machine, the combination with type-carriers and racks, couplings for connecting said type-carriers and racks for joint operation, optionally operable means for disengaging said couplings in a varying plurality of orders, and automatic means for reëngaging said couplings to connect said type-carriers and racks for joint operation after release of said optionally operable means.

21. In an adding machine, a series of type-carriers arranged in numerical orders and operable in recording operations, adding wheels also arranged in numerical orders, racks arranged to operate said adding wheels, and means for preventing operations of varied numbers of said racks when the corresponding type-carriers operate.

22. In an adding machine, a series of type-carriers arranged in numerical orders and operable in recording operations, adding wheels also arranged in numerical orders, racks arranged to operate said adding wheels, couplings actuated by said type-carriers for moving said racks effectively to operate said adding wheels to add the numbers recorded, means for disengaging varying numbers of said couplings from said racks, and springs for engaging said couplings with said racks.

for operating said adding wheels to add the numbers recorded by said type-carriers, and means for preventing operation of the adding wheels in a varying plurality of orders when the corresponding type-carriers operate.

12. An adding and recording machine, comprising type-carriers arranged in numerical orders and operable in recording operations, racks, adding wheels under control of said racks, means connecting said type-carriers with said racks whereby said racks will be operated with said type-carriers, and optionally operable means for disconnecting the racks from the type-carriers in a varying plurality of orders to enable the disconnected type-carriers to operate independently of the racks and adding wheels.

13. In an adding machine, type-carriers arranged in numerical orders and operable to record one or more columns of data at a single operation, a rack for each type-carrier, an adding wheel operatively related to each rack, releasable means connecting said racks with said type-carriers, and means for disconnecting the racks from the type-carriers in a varying plurality of orders to prevent addition of the data in one or more of said columns, as desired.

14. In an adding machine, a laterally movable paper carriage, recording devices arranged in numerical orders and operable to record numbers on paper in said carriage, racks operated by said recording devices, adding wheels controlled by said racks to add the numbers recorded, and mechanism under control of said paper carriage to prevent operation of said racks.

15. In an adding machine, recording devices arranged in numerical orders and operable to record numbers on paper in the paper carriage, a laterally movable paper carriage arranged to feed paper to said recording devices, adding wheels, racks connected to said recording devices for operating said adding wheels, means under control of the paper carriage for disconnecting said racks from said recording devices, and means for disconnecting certain of said racks from the corresponding recording devices independently of said carriage.

16. In an adding machine, a laterally movable paper, a series of type-carriers arranged in numerical orders and operable side by side to record numbers on paper in said carriage, racks, devices connecting said racks and said type-carriers, adding wheels arranged in numerical orders under control of said racks to add numbers recorded, and means under control of said paper carriage for disconnecting said racks from said type-carriers.

17. In an adding machine, a series of type-carriers arranged in numerical orders and operable side by side to record numbers, a laterally movable paper carriage for delivering paper to said type-carriers, racks, devices connecting said racks and said type-carriers, adding wheels under control of said racks to add the numbers recorded, means under control of said paper carriage for disconnecting said racks from said type-carriers, and means for disconnecting certain of said racks from corresponding type-carriers independently of said paper carriage.

18. In an adding machine, a series of type-carriers arranged in numerical orders, racks, releasable coupling devices coupling said racks with said type-carriers, and optionally operable means for disconnecting said coupling devices to release said racks in a varying plurality of orders.

19. In an adding and recording machine, the combination with type-carriers arranged in numerical orders and operable in recording operations, adding wheels also arranged in numerical orders, racks, couplings between said racks and type-carriers whereby said type-carriers will operate said racks and thereby said adding wheels to add the numbers recorded, of means for disengaging said couplings in a varying plurality of orders to enable varying numbers of said type-carriers to operate in recording operations independently of the corresponding racks and adding wheels, and means for holding stationary the racks from which said couplings are disengaged.

20. In an adding and recording machine, the combination with type-carriers and racks, couplings for connecting said type-carriers and racks for joint operation, optionally operable means for disengaging said couplings in a varying plurality of orders, and automatic means for reëngaging said couplings to connect said type-carriers and racks for joint operation after release of said optionally operable means.

21. In an adding machine, a series of type-carriers arranged in numerical orders and operable in recording operations, adding wheels also arranged in numerical orders, racks arranged to operate said adding wheels, and means for preventing operations of varied numbers of said racks when the corresponding type-carriers operate.

22. In an adding machine, a series of type-carriers arranged in numerical orders and operable in recording operations, adding wheels also arranged in numerical orders, racks arranged to operate said adding wheels, couplings actuated by said type-carriers for moving said racks effectively to operate said adding wheels to add the numbers recorded, means for disengaging varying numbers of said couplings from said racks, and springs for engaging said couplings with said racks.

of said type-carriers to operate independently of said racks at the will of the operator.

39. In an adding machine, a series of type-carriers, a series of adding wheels, a series of racks for actuating said adding wheels, couplings for connecting said racks with said type-carriers, a lever, a release device controlled by said lever for releasing said couplings, and means for operating said releasing device to release said couplings from said racks.

40. In an adding machine, a series of type-carriers, a series of racks, couplings supported by said type-carriers, means for engaging said couplings with said racks, a manipulative device for disengaging less than all of said couplings from the corresponding racks, and means for disconnecting all of said couplings from said racks.

41. In an adding machine, a series of type-carriers arranged in numerical orders and operable in recording operations, a series of adding wheels also arranged in numerical orders, a series of racks arranged to coöperate with said type-carriers and operate said adding wheels in adding operations incidentally to the operation of said type-carriers in recording operations, and means for preventing varied numbers of said racks from operating when the corresponding type-carriers operate in recording operations.

42. In an adding machine, a series of type-carriers arranged in numerical orders, a series of adding wheels also arranged in numerical orders, a series of racks for operating said adding wheels, means for operating said racks incidentally to the operation of said type-carriers in recording operations, and means for preventing operation of varied numbers of said racks at the will of the operator whereby said type-carriers may operate independently of said racks.

43. In an adding machine, a series of type-carriers, a series of racks, couplings pivoted upon said type-carriers, means for engaging said couplings with said racks, a rod extending across said couplings, means for operating said rod to disconnect all of said couplings from all of said racks, a device for disconnecting less than all of said couplings from the corresponding racks, and means for operating said device.

In witness whereof, I have signed this specification in the presence of two subscribing witnesses.

HARRY LANDSIEDEL.

Witnesses:
HENRY C. YAEGER,
HENRY DRYEAR.